US012293708B2

(12) United States Patent
Liu

(10) Patent No.: US 12,293,708 B2
(45) Date of Patent: May 6, 2025

(54) PIXEL DRIVING CIRCUIT AND DISPLAY PANEL

(71) Applicant: TCL China Star Optoelectronics Technology Co., Ltd., Shenzhen (CN)

(72) Inventor: Bin Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/423,855

(22) PCT Filed: May 31, 2021

(86) PCT No.: PCT/CN2021/097508
§ 371 (c)(1),
(2) Date: Aug. 18, 2022

(87) PCT Pub. No.: WO2022/170700
PCT Pub. Date: Aug. 18, 2022

(65) Prior Publication Data

US 2023/0419895 A1 Dec. 28, 2023

(30) Foreign Application Priority Data

Feb. 10, 2021 (CN) ......................... 202110184857.3

(51) Int. Cl.
*G09G 3/3233* (2016.01)
*G09G 3/32* (2016.01)
*G09G 3/3266* (2016.01)

(52) U.S. Cl.
CPC ............. *G09G 3/3233* (2013.01); *G09G 3/32* (2013.01); *G09G 3/3266* (2013.01); *G09G 2310/0216* (2013.01); *G09G 2310/0267* (2013.01)

(58) Field of Classification Search
CPC ....... G09G 3/3233; G09G 3/3258; G09G 3/32
See application file for complete search history.

(56) References Cited

U.S. PATENT DOCUMENTS 9,792,853 B2 10/2017 Jeon
10,176,759 B2 * 1/2019 Chen .................... G09G 3/3233
2013/0106307 A1 * 5/2013 Tan ...................... G09G 3/3225 315/291
2015/0084843 A1 * 3/2015 Li ........................ G09G 3/3233 345/76

(Continued)

FOREIGN PATENT DOCUMENTS

CN 103187024 A 7/2013
CN 106504703 A 3/2017
CN 107464526 A 12/2017

(Continued)

*Primary Examiner* — Yuzhen Shen
(74) *Attorney, Agent, or Firm* — Nathan & Associates; Menachem Nathan

(57) ABSTRACT

A pixel driving circuit proposed in the present application includes a first transistor, a second transistor, a third transistor, a fourth transistor, a fifth transistor, a sixth transistor, a capacitor and a light-emitting device. In the pixel driving circuit, a threshold-voltage compensation is performed on the first transistor, and this can efficiently improve attenuation of electric current of the light-emitting device caused by a drift of threshold voltage of a drive transistor, thereby improving stability of a display panel.

14 Claims, 4 Drawing Sheets

(56) References Cited

U.S. PATENT DOCUMENTS

2015/0301674 A1* 10/2015 Tan .................... H10K 59/1216
345/173

FOREIGN PATENT DOCUMENTS

| | | | |
|---|---|---|---|
| CN | 107507567 | A | 12/2017 |
| CN | 108682382 | A | 10/2018 |
| CN | 110634440 | A | 12/2019 |
| CN | 111179855 | A | 5/2020 |
| CN | 111986615 | A | 11/2020 |
| CN | 112767881 | A | 5/2021 |

* cited by examiner

PIXEL DRIVING CIRCUIT AND DISPLAY PANEL

FIELD OF THE DISCLOSURE

The present application relates to display technologies, and more particularly to a pixel driving circuit and a display panel.

DESCRIPTION OF RELATED ARTS

Because of high brightness, high illumination efficiency and low power consumption, light-emitting diode (LED) and organic light-emitting diode (OLED) displays have been rapidly applied to a technical field of display. In the display field, display modes are classified into an active driving mode and a passive driving mode. For the passive driving mode, its advantage is that the manufacture cost is low but it yields a complicated circuit in high-resolution applications. For the active driving mode, its advantage is that a drive transistor is used. The drive transistor needs only small transient driving current. It is easy to realize high-resolution display.

However, as time goes by, a threshold voltage of the drive transistor in a conventional driving circuit will be drifted, thereby causing a brightness change of the LED/OLED and seriously affects the visual experience.

SUMMARY

Technical Problems

The present application provides a pixel driving circuit and a display panel capable of effectively compensating a drift of threshold voltage of a drive transistor and improving stability of the display panel.

Technical Solutions

In a first aspect, the present application provides a pixel driving circuit, including a first transistor, a second transistor, a third transistor, a fourth transistor, a fifth transistor, a sixth transistor, a capacitor and a light-emitting device;

a source of the first transistor is electrically connected to a first node, a drain of the first transistor is electrically connected to a second node, and a gate of the first transistor is electrically connected to a third node;

the source of the second transistor is fed with the data signal, the drain of the second transistor is electrically connected to the second node, and the gate of the second transistor is fed with the first scan signal;

the source of the third transistor is electrically connected to a cathode of the light-emitting device, an anode of the light-emitting device is fed with a first power-supply signal, the drain of the third transistor is electrically connected to the first node, and the gate of the third transistor is fed with the first light-emitting control signal;

the source of the fourth transistor is electrically connected to the second node, the drain of the fourth transistor is fed with a second power-supply signal, and the gate of the fourth transistor is fed with the second light-emitting control signal;

the source of the fifth transistor is electrically connected to the first node, the drain of the fifth transistor is electrically connected to the third node, and the gate of the fifth transistor is fed with the second scan signal;

the source of the sixth transistor is fed with the first power-supply signal, the drain of the six transistor is electrically connected to the third node, and the gate of the six transistor is fed with the third scan signal;

a first end of the capacitor is electrically connected to the third node and a second end of the capacitor is fed with the second power-supply signal.

In the pixel driving circuit provided in the present application, the first scan signal, the second scan signal, the third scan signal, the first light-emitting control signal and the second light-emitting control signal are combined to establish an initialization phase, a threshold voltage storing phase and a light-emitting phase in chronological order.

In the pixel driving circuit provided in the present application, in the initialization phase, the first scan signal is at high level, the second scan signal is at low level, the third scan signal is at high level, the first light-emitting control signal is at low level, the second light-emitting control signal is at low level, a potential of the third node is initialized to be equal to the potential of the first power-supply signal, and the potential of the second node is initialized to be equal to a low voltage level of the data signal.

In the pixel driving circuit provided in the present application, in the threshold voltage storing phase, the first scan signal is at high level, the second scan signal is at high level, the third scan signal is at low level, the first light-emitting control signal is at low level, the second light-emitting control signal is at low level, the second node is charged to a high voltage level of the data signal, and a potential of the third node is reduced from the potential of the first power-supply signal to a sum of the potential of the data signal and a threshold voltage of the first transistor.

In the pixel driving circuit provided in the present application, in the light-emitting phase, the first scan signal is at low level, the second scan signal is at low level, the third scan signal is at low level, the first light-emitting control signal is at high level, the second light-emitting control signal is at high level, and the light-emitting device emits light.

In the pixel driving circuit provided in the present application, all of the first transistor, the second transistor, the third transistor, the fourth transistor, the fifth transistor and the sixth transistor are low-temperature polysilicon thin-film transistors, oxide-semiconductor thin-film transistors or amorphous-silicon thin-film transistors.

In the pixel driving circuit provided in the present application, an electric current flowing through the light-emitting device is independent from a threshold voltage of the first transistor.

In the pixel driving circuit provided in the present application, a potential of the first power-supply signal is greater than the potential of the second power-supply signal.

In the pixel driving circuit provided in the present application, the light-emitting device is a light-emitting diode.

In a second aspect, the present application further provides a display panel, including:

a data line, configured to provide a data signal;

a first scan line, configured to provide a first scan signal;

a second scan line, configured to provide a second scan signal;

a third scan line, configured to provide a third scan signal;

a first light-emitting control signal line, configured to provide a first light-emitting control signal;

a second light-emitting control signal line, configured to provide a second light-emitting control signal; and a pixel driving circuit, connected to the data line, the first scan line, the second scan line, the third scan line, the first light-emitting control signal line and the second light-emitting control signal line;

the pixel driving circuit includes a first transistor, a second transistor, a third transistor, a fourth transistor, a fifth transistor, a sixth transistor, a capacitor and a light-emitting device;

a source of the first transistor is electrically connected to a first node, a drain of the first transistor is electrically connected to a second node, and a gate of the first transistor is electrically connected to a third node;

the source of the second transistor is fed with the data signal, the drain of the second transistor is electrically connected to the second node, and the gate of the second transistor is fed with the first scan signal;

the source of the third transistor is electrically connected to a cathode of the light-emitting device, an anode of the light-emitting device is fed with a first power-supply signal, the drain of the third transistor is electrically connected to the first node, and the gate of the third transistor is fed with the first light-emitting control signal;

the source of the fourth transistor is electrically connected to the second node, the drain of the fourth transistor is fed with a second power-supply signal, and the gate of the fourth transistor is fed with the second light-emitting control signal;

the source of the fifth transistor is electrically connected to the first node, the drain of the fifth transistor is electrically connected to the third node, and the gate of the fifth transistor is fed with the second scan signal;

the source of the sixth transistor is fed with the first power-supply signal, the drain of the six transistor is electrically connected to the third node, and the gate of the six transistor is fed with the third scan signal;

a first end of the capacitor is electrically connected to the third node and a second end of the capacitor is fed with the second power-supply signal.

In the display panel provided in the present application, the first scan signal, the second scan signal, the third scan signal, the first light-emitting control signal and the second light-emitting control signal are combined to establish an initialization phase, a threshold voltage storing phase and a light-emitting phase in chronological order.

In the display panel provided in the present application, in the initialization phase, the first scan signal is at high level, the second scan signal is at low level, the third scan signal is at high level, the first light-emitting control signal is at low level, the second light-emitting control signal is at low level, a potential of the third node is initialized to be equal to the potential of the first power-supply signal, and the potential of the second node is initialized to be equal to a low voltage level of the data signal.

In the display panel provided in the present application, in the threshold voltage storing phase, the first scan signal is at high level, the second scan signal is at high level, the third scan signal is at low level, the first light-emitting control signal is at low level, the second light-emitting control signal is at low level, the second node is charged to a high voltage level of the data signal, and a potential of the third node is reduced from the potential of the first power-supply signal to a sum of the potential of the data signal and a threshold voltage of the first transistor.

In the display panel provided in the present application, in the light-emitting phase, the first scan signal is at low level, the second scan signal is at low level, the third scan signal is at low level, the first light-emitting control signal is at high level, the second light-emitting control signal is at high level, and the light-emitting device emits light.

In the display panel provided in the present application, all of the first transistor, the second transistor, the third transistor, the fourth transistor, the fifth transistor and the sixth transistor are low-temperature polysilicon thin-film transistors, oxide-semiconductor thin-film transistors or amorphous-silicon thin-film transistors.

In the display panel provided in the present application, an electric current flowing through the light-emitting device is independent from a threshold voltage of the first transistor.

In the display panel provided in the present application, a potential of the first power-supply signal is greater than the potential of the second power-supply signal.

In the display panel provided in the present application, the light-emitting device is a light-emitting diode.

Beneficial Effects

The present application provides a pixel driving circuit and a display panel. In the pixel driving circuit, a threshold-voltage compensation is performed on the first transistor, and this can efficiently improve attenuation of electric current of the light-emitting device caused by a drift of threshold voltage of a drive transistor, thereby improving stability of the display panel.

DESCRIPTION OF DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DESCRIPTION OF EMBODIMENTS OF THE DISCLOSURE

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

Figure 1:
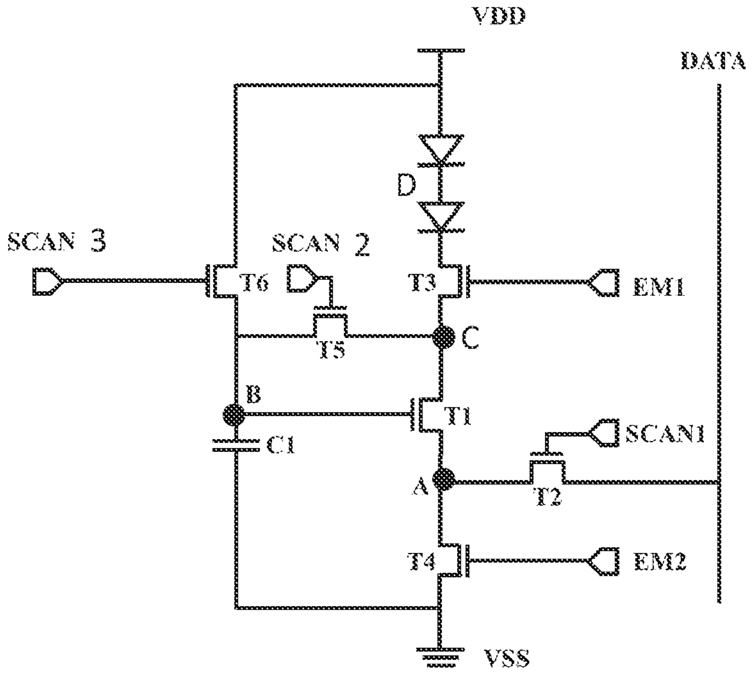
FIG. 1 is a schematic diagram illustrating a pixel driving circuit provided in an embodiment of the present application.

FIG. 1 is a schematic diagram illustrating a pixel driving circuit provided in an embodiment of the present application. As shown in FIG. 1, an embodiment of the present application provides a pixel driving circuit, which includes a first transistor T1, a second transistor T2, a third transistor T3, a fourth transistor T4, a fifth transistor T5, a sixth transistor T6, a capacitor C1 and a light-emitting device D. The light-emitting device D can be a light-emitting diode or an organic light-emitting diode. The number of the light-emitting devices D can be one or more than one. When there are a plurality of light-emitting devices D, the plurality of light-emitting devices D can be connected in series or connected in parallel.

In an embodiment of the present application, the first transistor T1 is a drive transistor. In the embodiment of the present application, a pixel driving circuit with a 6T1C (i.e., six transistors and one capacitor) structure is adopted to effectively compensate the threshold voltage of the drive transistor in each pixel. A smaller number of components are used, the structure is simple and stable, and the manufacture cost is saved.

The source of the first transistor T1 is electrically connected to a first node C. The drain of the first transistor T1 is electrically connected to a second node A. The gate of the first transistor T1 is electrically connected a third node B. The source of the second transistor T2 is fed with a data signal DATA. The drain of the second transistor T2 is electrically connected to the second node A. The gate of the second transistor T2 is fed with a first scan signal SCAN1. The source of the third transistor T3 is electrically connected a cathode of the light-emitting device D. An anode of the light-emitting device D is fed with a first power-supply signal VDD. The drain of the third transistor T3 is electrically connected to the first node C. The gate of the third transistor T3 is fed with a first light-emitting control signal EM1. The source of the fourth transistor T4 is electrically connected to the second node A. The drain of the fourth transistor T4 is fed with a second power-supply signal VSS. The gate of the fourth transistor T4 is fed with a second light-emitting control signal EM2. The source of the fifth transistor T5 is electrically connected to the first node C. The drain of the fifth transistor T5 is electrically connected to the third node B. The gate of the fifth transistor T5 is fed with a second scan signal SCAN2. The source of the sixth transistor T6 is fed with the first power-supply signal VDD. The drain of the sixth transistor T6 is electrically connected to the third node B. The gate of the sixth transistor T6 is fed with a third scan signal SCAN3. A first end of the capacitor C1 is electrically connected to the third node B. A second end of the capacitor C1 is fed with the second power-supply signal VSS.

It can be understood that the light-emitting device D is connected in series in a light-emitting circuit constructed by the first power-supply signal VDD and the second power-supply signal VSS. The first transistor T1 is configured to control an electric current flowing through the light-emitting circuit. The second transistor T2 is configured to write the data signal DATA to the pixel driving circuit based on the first scan signal SCAN1. The third transistor T3 is configured to open and close the light-emitting circuit based on the first light-emitting control signal EM1. The fourth transistor T4 is configured to open and close the light-emitting circuit based on the second light-emitting control signal EM2. The fifth transistor T5 is configured to accompany with the first transistor T1 to form a diode structure. The sixth transistor T6 is configured to initialize the third node B.

The third transistor T3 and the fourth transistor T4 are in a switched-off state or a saturated state simultaneously for controlling opening or closing the light-emitting circuit at the same time. That is, the first light-emitting control signal EM1 and the second light-emitting control signal EM2 can be a same signal.

It needs to be noted that the source and the drain of the transistor are symmetrical as used herein, and thus the source and the drain are interchangeable. In the embodiments of the present application, in order to distinguish the two electrodes of the transistor except for the gate, one of the two electrodes is called a source and the other of the two electrodes is called a drain. A middle end of the transistor is a gate, a signal input end of the transistor is a source and a signal output end of the transistor is the drain, as specified according to a shape or pattern shown in the appending figures.

In some embodiments, both the first power-supply signal VDD and the second power-supply signal VSS are configured to output predetermined voltage values. In addition, in an embodiment of the present application, the potential of the first power-supply signal VDD is greater than the potential of the second power-supply signal VSS. That is, the light-emitting device D of an embodiment of the present application is located close to an end with a high-level input. This can effectively reduce the voltage amplitude of scan signals in the pixel driving circuit, and thus it is beneficial to lowering the difficulty of implementation of the pixel driving circuit.

In some embodiments, the first transistor T1, the second transistor T2, the third transistor T3, the fourth transistor T4, the fifth transistor T5 and the sixth transistor T6 are low-temperature polysilicon thin-film transistors, oxide-semiconductor thin-film transistors or amorphous-silicon thin-film transistors. The transistors used in the pixel driving circuit provided in an embodiment of the present application are of a same type of transistors, thereby preventing the pixel driving circuit from being affected by differences between different types of transistors.

Figure 2:
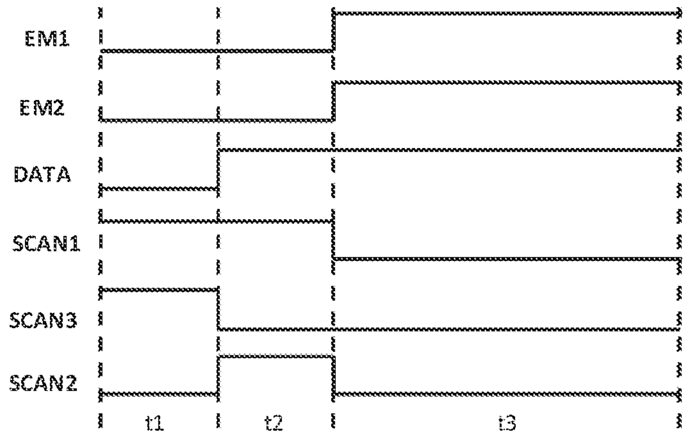
FIG. 2 is a timing diagram of a pixel driving circuit provided in an embodiment of the present application.

FIG. 2 is a timing diagram of a pixel driving circuit provided in an embodiment of the present application. As shown in FIG. 2, the first scan signal SCAN1, the second scan signal SCAN2, the third scan signal SCAN3, the first light-emitting control signal EM1 and the second light-emitting control signal EM2 are combined to establish an initialization phase t1, a threshold voltage storing phase t2 and a light-emitting phase t3 in chronological order.

In some embodiments, in the initialization phase t1, the first scan signal SCAN1 is at high level, the second scan signal SCAN2 is at low level, the third scan signal SCAN3 is at high level, the first light-emitting control signal EM1 is at low level, the second light-emitting control signal EM2 is at low level, the potential of the third node B is initialized to be equal to the potential of the first power-supply signal VDD, and the potential of the second node A is initialized to be equal to a low voltage level of the data signal DATA.

In some embodiments, in the threshold voltage storing phase t2, the first scan signal SCAN1 is at high level, the second scan signal SCAN2 is at high level, the third scan signal SCAN3 is at low level, the first light-emitting control signal EM1 is at low level, the second light-emitting control signal EM2 is at low level, the second node A is charged to a high voltage level of the data signal DATA, and the potential of the third node B is reduced from the potential of the first power-supply signal VDD to a sum of the potential of the data signal DATA and the threshold voltage of the first transistor T1.

In some embodiments, in the light-emitting phase t3, the first scan signal SCAN1 is at low level, the second scan signal SCAN2 is at low level, the third scan signal SCAN3 is at low level, the first light-emitting control signal EM1 is at high level, the second light-emitting control signal EM2 is at high level, and the light-emitting device D emits light.

Figure 3:
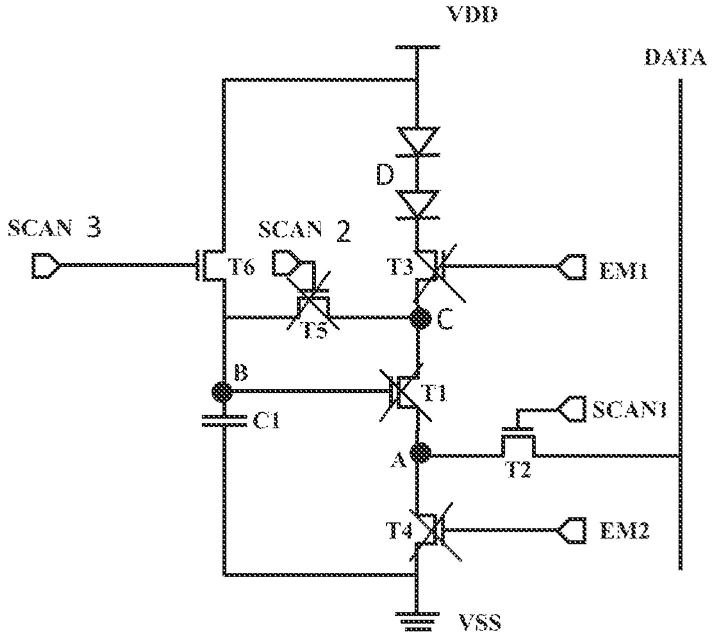
FIG. 3 is a schematic diagram illustrating a circuit configuration of a pixel driving circuit provided in an embodiment of the present application in an initialization phase of the timing shown in FIG. 2.

Specifically, FIG. 3 is a schematic diagram illustrating a circuit configuration of a pixel driving circuit provided in an embodiment of the present application in an initialization phase of the timing shown in FIG. 2. First, with reference to FIG. 2 and FIG. 3, in the initialization phase t1, the first scan signal SCAN1 is at high level, and the second transistor T2 is switched on under the control of the high level of the second scan signal SCAN2. Meanwhile, the data signal DATA is at an initial level, and the initial level of the data signal DATA is outputted to the second node A via the second transistor T2, thereby making the second node A be initialized in the initialization phase t1 to be equal to the initial level of the data signal DATA. In the initialization phase t1, the third scan signal SCAN3 is at high level, the sixth transistor T6 is switched on under the control of the high level of the third scan signal SCAN3, and the first power-supply signal VDD is outputted to the third node B via the sixth transistor T6, thereby making the third node B be initialized in the initialization phase t1 to be equal to the potential of the first power-supply signal VDD. Due to the action of the capacitor C1, the potential of the third node B maintains at the potential of the first power-supply signal VDD. It needs to be noted that at this moment, the potential of the first power-supply signal VDD is sufficient to make the first transistor T1 be switched on.

Meanwhile, in the initialization phase t1, all the second scan signal SCAN2, the first light-emitting control signal EM1 and the second light-emitting control signal EM2 are at low level, and the fifth transistor T5 is switched off under the control of the low level of the second scan signal SCAN2; the third transistor T3 is switched off under the control of the low level of the first light-emitting control signal EM1; and the fourth transistor T4 is switched off under the control of the low level of the second light-emitting control signal EM2.

Figure 4:
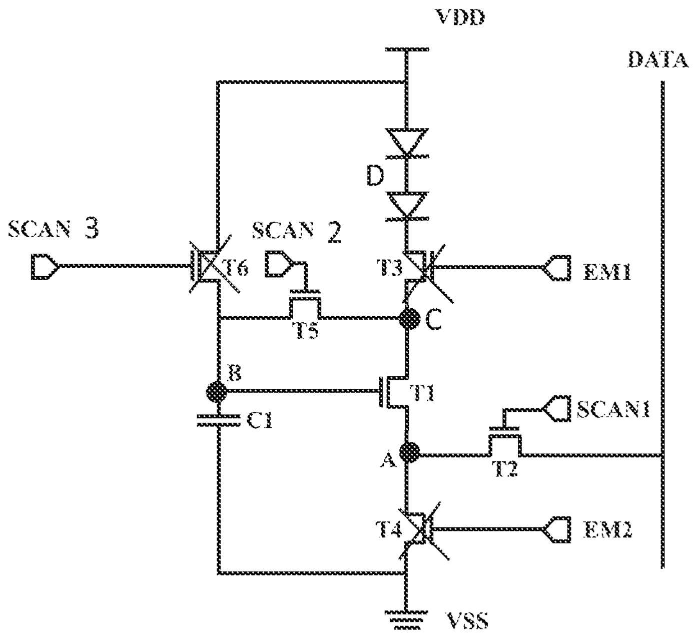
FIG. 4 is a schematic diagram illustrating a circuit configuration of a pixel driving circuit provided in an embodiment of the present application in a threshold voltage storing phase of the timing shown in FIG. 2.

Next, FIG. 4 is a schematic diagram illustrating a circuit configuration of a pixel driving circuit provided in an embodiment of the present application in a threshold voltage storing phase of the timing shown in FIG. 2. With reference to FIG. 2 and FIG. 4, in the threshold voltage storing phase t2, the second scan signal SCAN2 is at high level, and the fifth transistor T5 is switched on under the control of the high level of the second scan signal SCAN2. Due to the action of the capacitor C1, at the beginning of the threshold voltage storing phase t2, the potential of the third node B maintains at the potential in the initialization phase t1, thereby making the first transistor T1 be switched on. The first transistor T1 and the fifth transistor T5 construct a diode structure. In the threshold voltage storing phase t2, the first scan signal SCAN1 is at high level, and the second transistor T2 is switched on under the control of the high level of the first scan signal SCAN1. Meanwhile, the data signal DATA is at a data voltage level, and the data voltage level of the data signal DATA is outputted to the second node A via the second transistor T2, thereby making the potential of the second node A is the high level of the data signal DATA. Based on the principle of the diode structure, the potential of the third node B is reduced from the potential of the first power-supply signal VDD to a sum of the data voltage level of the data signal DATA and the threshold voltage of the first transistor T1, thereby accomplishing the storing of the threshold voltage of the first transistor T1.

Meanwhile, in the threshold voltage storing phase t2, all the third scan signal SCAN3, the first light-emitting control signal EM1 and the second light-emitting control signal EM2 are at low level, and the sixth transistor T6 is switched off under the control of the low level of the third scan signal SCAN3; the third transistor T3 is switched off under the control of the low level of the first light-emitting control signal EM1; and the fourth transistor T4 is switched off under the control of the low level of the second light-emitting control signal EM2.

Figure 5:
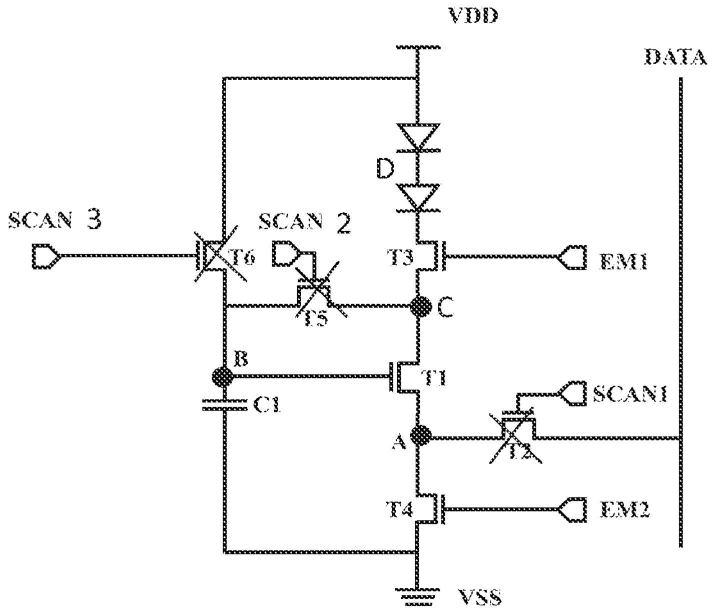
FIG. 5 is a schematic diagram illustrating a circuit configuration of a pixel driving circuit provided in an embodiment of the present application in a light-emitting phase of the timing shown in FIG. 2.

Finally, FIG. 5 is a schematic diagram illustrating a circuit configuration of a pixel driving circuit provided in an embodiment of the present application in a light-emitting phase of the timing shown in FIG. 2. With reference to FIG. 2 and FIG. 5, in the light-emitting phase t3, both the first light-emitting control signal EM1 and the second light-emitting control signal EM2 are at high level, the third transistor T3 is switched on under the control of the high level of the first light-emitting control signal EM1, and the fourth transistor T4 is switched on under the control of the high level of the second light-emitting control signal EM2. In addition, the potential of the third node B is a sum of the data voltage level of the data signal DATA and the threshold voltage of the first transistor T1. At this moment, the first transistor T1 is switched on, and the light-emitting device D emits light.

Meanwhile, all the first scan signal SCAN1, the second scan signal SCAN2 and the third scan signal SCAN3 are at low level, and the second transistor T2 is switched off under the control of the low level of the first scan signal SCAN1; the fifth transistor T5 is switched off under the control of the low level of the second scan signal SCAN2; and the six transistor T6 is switched off under the control of the low level of the third scan signal SCAN3.

Specifically, in the light-emitting phase t3, the voltage difference between the gate and the drain of the first transistor T1 can be obtained based on the following formula: $Vgs=Vg-Vs=VB-VA=VDATA+Vth+\Delta Vth$, where Vgs is the voltage difference between the gate and the drain of the first transistor T1, VB is the potential of the third node B, VA is the potential of the second node A, VDATA is the data voltage level of the data signal DATA, and $Vth+\Delta Vth$ is the threshold voltage of the first transistor T1.

For more details, a formula for calculating an electric current flowing through the light-emitting device D is listed as below:

$IOLED=\frac{1}{2}Cox(\mu 1W1/L1)(Vgs-(Vth+\Delta Vth)2$, where IOLED is the electric current flowing through the light-emitting device D, μ1 is the carrier mobility of the first transistor T1, W1 and L1 are the channel width and length of the first transistor T1, respectively, Vgs is the voltage difference between the gate and the drain of the first transistor T1, and $Vth+\Delta Vth$ is the threshold voltage of the first transistor T1.

That is, the electric current flowing through the light-emitting device D is $IOLED=\frac{1}{2}Cox(\mu 1W1/L1)(Vgs-(Vth+\Delta Vth))2=\frac{1}{2}Cox(\mu 1W1/L1)(VDATA+Vth+\Delta Vth-(Vth+\Delta Vth))2=\frac{1}{2}Cox(\mu 1W1/L1)VDATA2$.

Figure 6:
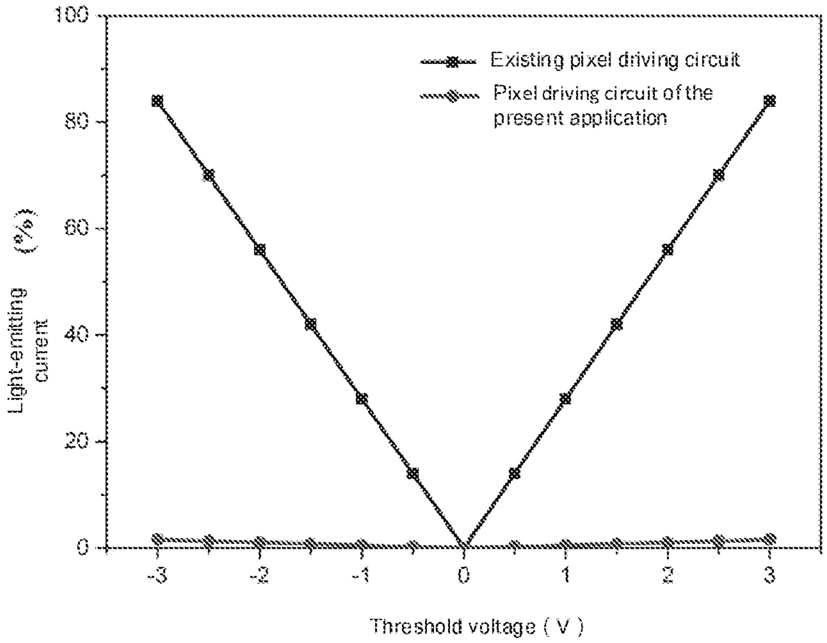
FIG. 6 is a schematic diagram illustrating a relation between a light-emitting current and a threshold voltage in a pixel driving circuit provided in an embodiment of the present application.

FIG. 6 is a schematic diagram illustrating a relation between a light-emitting current and a threshold voltage in a pixel driving circuit provided in an embodiment of the present application. As shown in FIG. 6, an amount of changes of the electric current of a circuit with any compensation corresponding to the threshold voltage with a change of ±3V is greater than 85%. With the same amount of changes of the threshold, an amount of changes of the electric current of the pixel driving circuit provided in an embodiment of the present application is less than 1.6%. The compensation is realized with an impressive effect.

As can be seen, the electric current of the light-emitting device is independent from the threshold voltage of the first transistor. The compensation is realized. The light-emitting device emits light, and the electric current flowing through the light-emitting device is independent from the threshold voltage of the first transistor.

Figure 7:
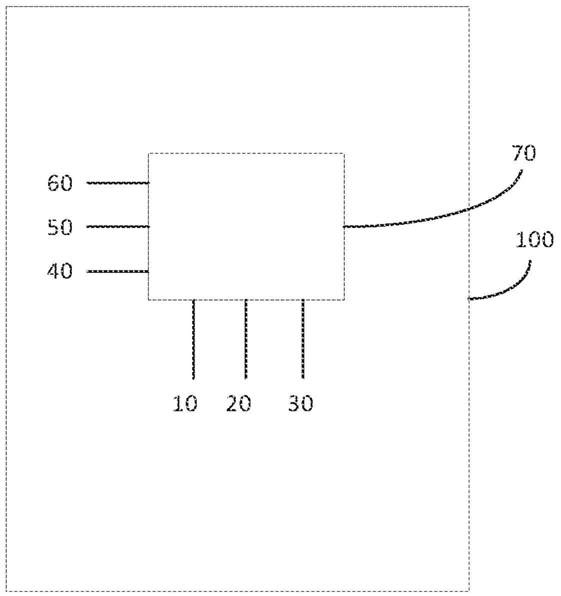
FIG. 7 is a structural schematic diagram illustrating a display panel provided in an embodiment of the present application.

FIG. 7 is a structural schematic diagram illustrating a display panel provided in an embodiment of the present application. An embodiment of the present application further provides a display panel 100, which includes a first scan line 10, a second scan line 20, a third scan line 30, a first light-emitting control signal line 40, a second light-emitting control signal line 50, a data line 60 and the afore-described pixel driving circuit 70. The data line 60 is configured to provide a data signal. The first scan line 10 is configured to provide a first scan signal. The second scan line 20 is configured to provide a second scan signal. The third scan line 30 is configured to provide a third scan signal. The first light-emitting control signal line 40 is configured to provide a first light-emitting control signal. The second light-emitting control signal line 50 is configured to provide a second light-emitting control signal. The pixel driving circuit 70 is connected to the data line 60, the first scan line 10, the second scan line 20, the third scan line 30, the first light-emitting control signal line 40 and the second light-emitting control signal line 50. The pixel driving circuit 70 can be referred to above descriptions on the pixel driving circuit, and is not detailed herein.

The above are merely embodiments of the present application and the claims of the present application are not limited thereto accordingly. Any modifications of equivalent structures or equivalent processes, or directly or indirectly used in other related technical fields based on the content of the specification and drawings of the present application are still covered by the claims of the present application.

The invention claimed is:

1. A pixel driving circuit, comprising a first transistor, a second transistor, a third transistor, a fourth transistor, a fifth transistor, a sixth transistor, a capacitor and a light-emitting device;

a source of the first transistor is electrically connected to a first node, a drain of the first transistor is electrically connected to a second node, and a gate of the first transistor is electrically connected to a third node;

the source of the second transistor is fed with a data signal, the drain of the second transistor is electrically connected to the second node, and the gate of the second transistor is fed with a first scan signal;

the source of the third transistor is electrically connected to a cathode of the light-emitting device, an anode of the light-emitting device is fed with a first power-supply signal, the drain of the third transistor is electrically connected to the first node, and the gate of the third transistor is fed with a first light-emitting control signal;

the source of the fourth transistor is electrically connected to the second node, the drain of the fourth transistor is fed with a second power-supply signal, and the gate of the fourth transistor is fed with a second light-emitting control signal;

the source of the fifth transistor is electrically connected to the first node, the drain of the fifth transistor is electrically connected to the third node, and the gate of the fifth transistor is fed with a second scan signal;

the source of the sixth transistor is fed with the first power-supply signal, the drain of the six transistor is directly connected to the third node and is electrically connected to the drain of the fifth transistor, and the gate of the six transistor is fed with a third scan signal; wherein the first scan signal, the second scan signal and the third scan signal are different;

a first end of the capacitor is electrically connected to the third node and a second end of the capacitor is fed with the second power-supply signal, wherein the light-emitting device is connected in series in a light-emitting circuit constructed by the first power-supply signal and the second power-supply signal, the first transistor is configured to control an electric current flowing through the light-emitting circuit, the second transistor is configured to write the data signal to the pixel driving circuit based on the first scan signal, the third transistor is configured to open and close the light-emitting circuit based on the first light-emitting control signal, the fourth transistor is configured to open and close the light-emitting circuit based on the second light-emitting control signal, the fifth transistor is configured to accompany with the first transistor to form a diode structure, and the sixth transistor is configured to initialize the third node, wherein the first scan signal, the second scan signal, the third scan signal, the first light-emitting control signal and the second light-emitting control signal are combined to establish an initialization phase, a threshold voltage storing phase and a light-emitting phase in chronological order, in the initialization phase, the first scan signal is at high level, the second scan signal is at low level, the third scan signal is at high level, the first light-emitting control signal is at low level, the second light-emitting control signal is at low level, a potential of the third node is initialized to be equal to the potential of the first power-supply signal, and the potential of the second node is initialized to be equal to a low voltage level of the data signal.

2. The pixel driving circuit according to claim 1, wherein in the threshold voltage storing phase, the first scan signal is at high level, the second scan signal is at high level, the third scan signal is at low level, the first light-emitting control signal is at low level, the second light-emitting control signal is at low level, the second node is charged to a high voltage level of the data signal, and a potential of the third node is reduced from the potential of the first power-supply signal to a sum of the potential of the data signal and a threshold voltage of the first transistor.

3. The pixel driving circuit according to claim 1, wherein in the light-emitting phase, the first scan signal is at low level, the second scan signal is at low level, the third scan signal is at low level, the first light-emitting control signal is at high level, the second light-emitting control signal is at high level, and the light-emitting device emits light.

4. The pixel driving circuit according to claim 1, wherein all of the first transistor, the second transistor, the third transistor, the fourth transistor, the fifth transistor and the sixth transistor are low-temperature polysilicon thin-film transistors, oxide-semiconductor thin-film transistors or amorphous-silicon thin-film transistors.

5. The pixel driving circuit according to claim 1, wherein an electric current flowing through the light-emitting device is independent from a threshold voltage of the first transistor.

6. The pixel driving circuit according to claim 1, wherein a potential of the first power-supply signal is greater than the potential of the second power-supply signal.

7. The pixel driving circuit according to claim 1, wherein the light-emitting device is a light-emitting diode.

8. A display panel, comprising:

a data line, configured to provide a data signal;

a first scan line, configured to provide a first scan signal;

a second scan line, configured to provide a second scan signal;

a third scan line, configured to provide a third scan signal; wherein the first scan signal, the second scan signal and the third scan signal are different;

a first light-emitting control signal line, configured to provide a first light-emitting control signal;

a second light-emitting control signal line, configured to provide a second light-emitting control signal; and a pixel driving circuit, connected to the data line, the first scan line, the second scan line, the third scan line, the first light-emitting control signal line and the second light-emitting control signal line;

the pixel driving circuit comprises a first transistor, a second transistor, a third transistor, a fourth transistor, a fifth transistor, a sixth transistor, a capacitor and a light-emitting device;

a source of the first transistor is electrically connected to a first node, a drain of the first transistor is electrically connected to a second node, and a gate of the first transistor is electrically connected to a third node;

the source of the second transistor is fed with the data signal, the drain of the second transistor is electrically connected to the second node, and the gate of the second transistor is fed with the first scan signal;

the source of the third transistor is electrically connected to a cathode of the light-emitting device, an anode of the light-emitting device is fed with a first power-supply signal, the drain of the third transistor is electrically connected to the first node, and the gate of the third transistor is fed with the first light-emitting control signal;

the source of the fourth transistor is electrically connected to the second node, the drain of the fourth transistor is fed with a second power-supply signal, and the gate of the fourth transistor is fed with the second light-emitting control signal;

the source of the fifth transistor is electrically connected to the first node, the drain of the fifth transistor is electrically connected to the third node, and the gate of the fifth transistor is fed with the second scan signal;

the source of the sixth transistor is fed with the first power-supply signal, the drain of the six transistor is directly connected to the third node and is electrically connected to the drain of the fifth transistor, and the gate of the six transistor is fed with the third scan signal;

a first end of the capacitor is electrically connected to the third node and a second end of the capacitor is fed with the second power-supply signal, wherein the light-emitting device is connected in series in a light-emitting circuit constructed by the first power-supply signal and the second power-supply signal, the first transistor is configured to control an electric current flowing through the light-emitting circuit, the second transistor is configured to write the data signal to the pixel driving circuit based on the first scan signal, the third transistor is configured to open and close the light-emitting circuit based on the first light-emitting control signal, the fourth transistor is configured to open and close the light-emitting circuit based on the second light-emitting control signal, the fifth transistor is configured to accompany with the first transistor to form a diode structure, and the sixth transistor is configured to initialize the third node, wherein the first scan signal, the second scan signal, the third scan signal, the first light-emitting control signal and the second light-emitting control signal are combined to establish an initialization phase, a threshold voltage storing phase and a light-emitting phase in chronological order, in the initialization phase, the first scan signal is at high level, the second scan signal is at low level, the third scan signal is at high level, the first light-emitting control signal is at low level, the second light-emitting control signal is at low level, a potential of the third node is initialized to be equal to the potential of the first power-supply signal, and the potential of the second node is initialized to be equal to a low voltage level of the data signal.

9. The display panel according to claim 8, wherein in the threshold voltage storing phase, the first scan signal is at high level, the second scan signal is at high level, the third scan signal is at low level, the first light-emitting control signal is at low level, the second light-emitting control signal is at low level, the second node is charged to a high voltage level of the data signal, and a potential of the third node is reduced from the potential of the first power-supply signal to a sum of the potential of the data signal and a threshold voltage of the first transistor.

10. The display panel according to claim 8, wherein in the light-emitting phase, the first scan signal is at low level, the second scan signal is at low level, the third scan signal is at low level, the first light-emitting control signal is at high level, the second light-emitting control signal is at high level, and the light-emitting device emits light.

11. The display panel according to claim 8, wherein all of the first transistor, the second transistor, the third transistor, the fourth transistor, the fifth transistor and the sixth transistor are low-temperature polysilicon thin-film transistors, oxide-semiconductor thin-film transistors or amorphous-silicon thin-film transistors.

12. The display panel according to claim 8, wherein an electric current flowing through the light-emitting device is independent from a threshold voltage of the first transistor.

13. The display panel according to claim 8, wherein a potential of the first power-supply signal is greater than the potential of the second power-supply signal.

14. The display panel according to claim 8, wherein the light-emitting device is a light-emitting diode.

* * * * *